(12) United States Patent
Chung et al.

(10) Patent No.: US 11,042,420 B2
(45) Date of Patent: *Jun. 22, 2021

(54) SYSTEM, METHOD AND RECORDING MEDIUM FOR TEMPERATURE-AWARE TASK SCHEDULING

(71) Applicant: International Business Machines Corporation, Armonk, NY (US)

(72) Inventors: I-Hsin Chung, Chappaqua, NY (US); Huan Hu, Yorktown Heights, NY (US); Wei Tan, Elmsford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,263

(22) Filed: Jan. 30, 2020

(65) Prior Publication Data
US 2020/0167206 A1    May 28, 2020

Related U.S. Application Data

(63) Continuation of application No. 16/056,670, filed on Aug. 7, 2018, which is a continuation of application No. 15/238,258, filed on Aug. 16, 2016, now Pat. No. 10,133,610.

(51) Int. Cl.
| G06F 9/46 | (2006.01) |
| G06F 9/50 | (2006.01) |
| G06T 1/20 | (2006.01) |
| G06F 9/48 | (2006.01) |
| G06F 3/06 | (2006.01) |

(52) U.S. Cl.
CPC ............ *G06F 9/5094* (2013.01); *G06F 3/061* (2013.01); *G06F 3/0653* (2013.01); *G06F 3/0673* (2013.01); *G06F 9/4893* (2013.01); *G06F 9/5016* (2013.01); *G06T 1/20* (2013.01); *G06T 2200/28* (2013.01)

(58) Field of Classification Search
None
See application file for complete search history.

(56) References Cited

U.S. PATENT DOCUMENTS

| 8,643,676 B2 | 2/2014 | Matsui |
| 8,819,686 B2 | 8/2014 | Memik et al. |
| 10,133,610 B2 * | 11/2018 | Chung .................. G06F 9/4893 |
| 2010/0218005 A1 | 8/2010 | Jain et al. |
| 2011/0023039 A1 | 1/2011 | Memik |
| 2011/0316663 A1 | 12/2011 | Tarkoma |
| 2012/0081373 A1 | 4/2012 | Li et al. |

(Continued)

OTHER PUBLICATIONS

Leng et al., "Safe Limits on Voltage Reduction Efficiency in GPUs: a Direct Measurement Approach", ACM, pp. 1-7. (Year: 2015).*

(Continued)

*Primary Examiner* — Kenneth Tang
(74) *Attorney, Agent, or Firm* — Vazken Alexanian; McGinn I.P. Law Group, PLLC

(57) ABSTRACT

A temperature-aware task scheduling method, system, and computer program product, includes obtaining a temperature of the GPU and accepting and executing the task to the GPU, in response to the obtaining a temperature of the GPU.

10 Claims, 5 Drawing Sheets

(56) References Cited

U.S. PATENT DOCUMENTS

| | | | |
|---|---|---|---|
| 2012/0257650 A1* | 10/2012 | Chowdhury | G01K 7/01 374/178 |
| 2013/0104140 A1* | 4/2013 | Meng | G06F 9/4881 718/104 |
| 2014/0237272 A1 | 8/2014 | Sadowski | |
| 2015/0178138 A1 | 6/2015 | Saha et al. | |
| 2015/0227391 A1* | 8/2015 | Paul | G06F 1/206 718/102 |
| 2015/0346809 A1* | 12/2015 | Kumar | G06F 1/3293 713/323 |
| 2015/0348226 A1* | 12/2015 | Vaishampayan | G09G 5/363 345/503 |
| 2016/0077539 A1 | 3/2016 | Lee et al. | |
| 2017/0038805 A1 | 2/2017 | Chun | |
| 2017/0371719 A1* | 12/2017 | Majumdar | G06F 9/4893 |
| 2018/0052709 A1* | 2/2018 | Fong | G06F 9/5044 |

OTHER PUBLICATIONS

Leng et al. "Safe Limits on Voltage Reduction Efficiency in GPUs: a Direct Measurement Approach", 2015, ACM, pp. 294-307. (Year: 2015).*

United States Notice of Allowance dated Dec. 10, 2019, in U.S. Appl. No. 16/056,670.
United States Office Action dated Nov. 21, 2019, in U.S. Appl. No. 16/056,670.
United States Office Action dated Aug. 16, 2019, in U.S. Appl. No. 16/056,670.
United States Notice of Allowance dated Jul. 11, 2018, in U.S. Appl. No. 15/238,258.
United States Office Action dated Jun. 12, 2018, in U.S. Appl. No. 15/238,258.
United States Office Action dated May 15, 2018, in U.S. Appl. No. 15/238,258.
Mel, et al. "The NIST Definition of Cloud Computing". Recommendations of the National Institute of Standards and Technology. Nov. 16, 2015.
Wiltzius, T.; "GPU Accelerated Compositing in Chrome"; http://ip.com/IPCOM/000239227D; Oct. 22, 2014.
Anonymously; "A System and Method for Smart Workload Management on Asymmetric Multicore Architectures"; hitp://ip.com/IPCOM/000236928D; May 22, 2014.
IBM; "System and a Method to Optimize Scheduling Software Workload Partitions such as WPAR to Improve Performance"; http://ip.com/IPCOM/000179639D; Feb. 19, 2009. AN-10646111; "2009 IEEE International Symposium on Performance Analysis of Systems & Software"; IEEE Computing Society & Symposium in Title; 2009.

* cited by examiner

TEMPERATURE AWARE TASK SCHEDULING METHOD 100

SYSTEM, METHOD AND RECORDING MEDIUM FOR TEMPERATURE-AWARE TASK SCHEDULING

CROSS-REFERENCE TO RELATED APPLICATIONS

The present application is a Continuation Application of U.S. patent application Ser. No. 16/056,670, filed on Aug. 7, 2018, which is a Continuation Application of U.S. patent application Ser. No. 15/238,258, filed on Aug. 16, 2016, now U.S. Pat. No. 10,133,610, Issued on Nov. 20, 2018, the entire contents of which are hereby incorporated by reference.

BACKGROUND

The present invention relates generally to a temperature-aware task scheduling method for one or more graphical processing units (GPUs), and more particularly, but not by way of limitation, to a system, method, and recording medium for scheduling a task for a GPU based on a temperature and an intensiveness of each of an arithmetic logic unit (ALU) and a dynamic random-access memory (DRAM) component.

Rapid evolution of GPUs in performance, architecture, and programmability provides general and scientific computational potential far beyond their primary purpose of Graphical processing. Graphical Processing Units (GPUs) are pervasive in cognitive applications, for example. GPUs are readily available for cloud computing. For GPU users (e.g., single workload), performance is key and on which most of the conventional techniques focus improvements. For GPU owners, resource utilization is key based on how to compact more workloads into limited resources.

Conventional techniques have only considered monitoring a total temperature of the GPU when for example such total temperature is driven by an arithmetic logic unit (ALU) component, which is heavily loaded and overheated, while at the same time a DRAM unit component is not heavily loaded. Alternatively, the total temperature can be driven by a DRAM unit that is heavily loaded, and may become overheated, while an ALU unit is not loaded heavily.

There is a need in the art to consider a temperature difference of ALU and DRAM inside a GPU unit such that the ALU and DRAM can be overheated with a new task.

SUMMARY

In an exemplary embodiment, the present invention provides a computer-implemented method for scheduling a task on a graphical processing unit (GPU), the method including, the GPU, receiving a request to execute a task collecting task information (including an intensiveness factor) of a computation by an internal arithmetic logic unit (ALU) and a dynamic random-access memory (DRAM) for a task, obtaining a temperature of the ALU and the DRAM, and accepting the task to the GPU based on the intensiveness factor, ALU temperature and DRAM temperature.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and such description should not be regarded as limiting.

Thus, those skilled in the art will appreciate that the invention upon which this disclosure is based may readily be utilized as a basis for the designing of equivalent structures, methods and systems that may carry out one or more purposes of the present invention. It is important, therefore, that the claims be regarded as including such equivalents, insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
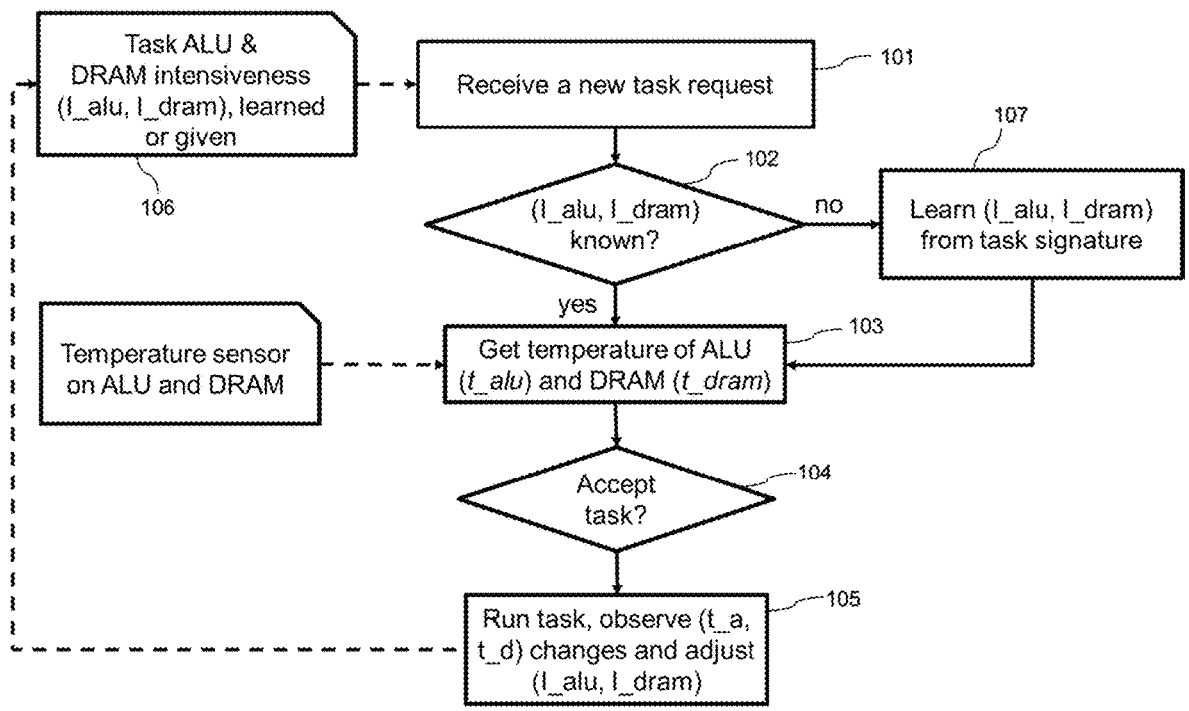
FIG. 1 shows a high-level flow chart for a temperature-aware task scheduling method according to an embodiment of the present invention.

The invention will now be described with reference to FIG. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 3:
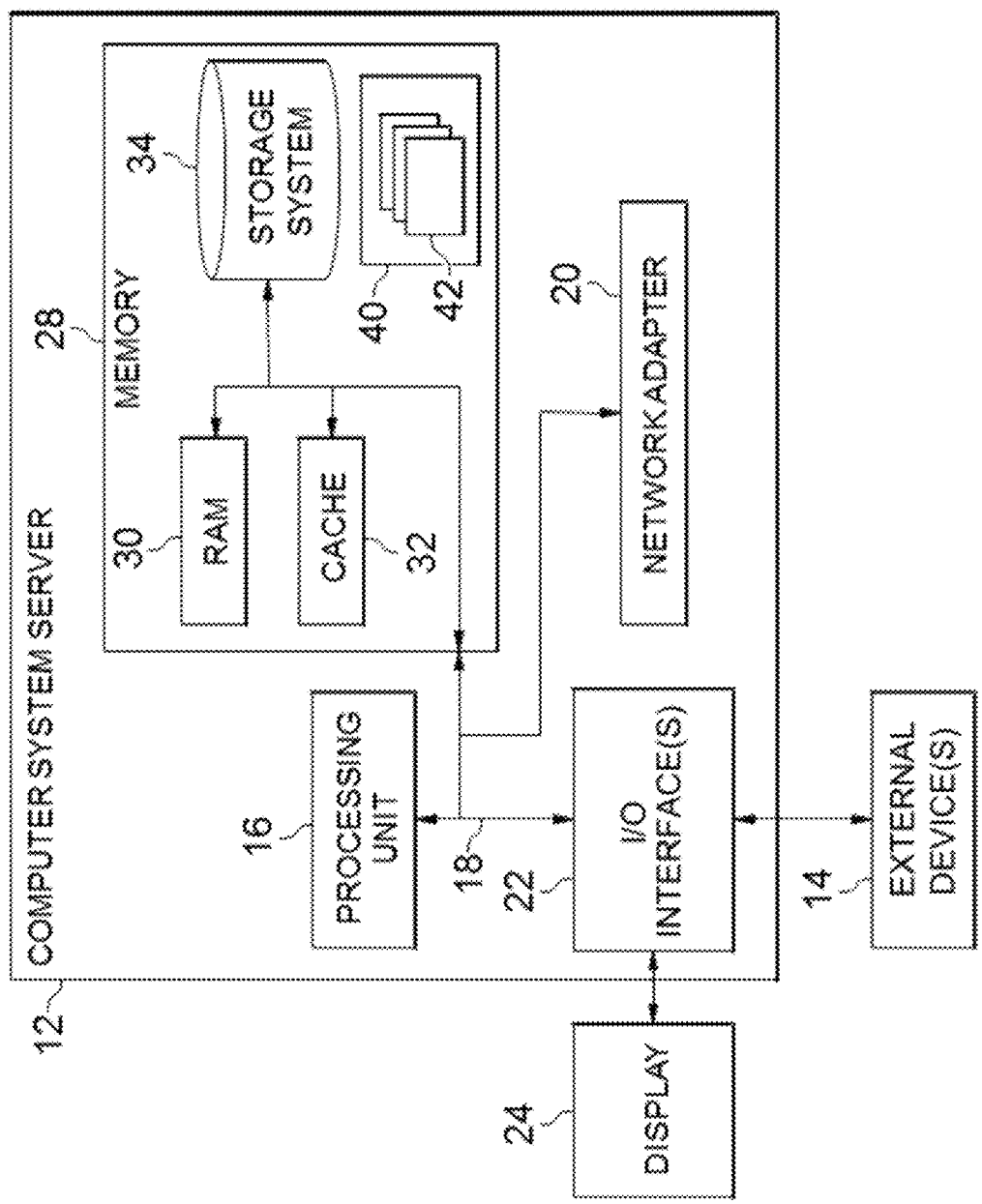
FIG. 3 depicts a cloud computing node according to an embodiment of the present invention.

By way of overview with reference to the example depicted in FIG. 1, the temperature-aware task scheduling method 100 in accordance with the present invention includes scheduling a task based on temperature measurements of the ALU and DRAM, as well as an intensiveness factor associated with the task and determining whether the ALU and DRAM may exceed a threshold intensiveness factor. With reference now to FIG. 3, one or more computers of a computer system 12 according to an embodiment of the present invention can include a memory 28 having instructions stored in a storage system to perform the steps of FIG. 1.

Although one or more embodiments (see e.g., FIGS. 3-5) may be implemented in a cloud environment 50 (see e.g., FIG. 4), it is nonetheless understood that the present invention can be implemented outside of the cloud environment.

Referring again to FIG. 1, in step 101, a new task for the GPU to process is received.

In step 102, an intensiveness factor for each of the computational requirement of the new task (I_alu) and the memory usage requirement of the new task (I_dram) is determined if not already known. For example, if the new task had been previously run on the GPU, the intensiveness would already be known.

An intensiveness factor of the computational requirements can refer to a processing requirement associated with the task and therefor, a potential resulting temperature increase of the ALU performing the task. In general, the greater the processing requirement for a computation, the higher the corresponding intensiveness factor will be. Similarly, an intensiveness factor associated with a memory usage requirement can refer to the processing requirements of the DRAM and the resulting temperature increase that will occur. In general, the greater the processing requirement for memory usage, the higher the intensiveness factor will be for the memory usage requirement. That is, the intensiveness factor reflects the temperature increase for each of the ALU and the DRAM, independently of each other, that will occur when the new task is processed by the GPU.

In some embodiments, in steps 101 and 102, an intensiveness factor(s) for a computation by an ALU and for a memory usage by DRAM) is collected for a new task to be performed by a GPU.

In some embodiments, the intensiveness factor of the new task can be a user input value. Alternatively, in Step 107, if the intensiveness factor is unknown (e.g., "NO"), the intensiveness factor can be learned from a task signature of the new task. That is, each new task is associated with a task signature. The task signature is based on the task parameters, and their access mode (e.g., read or write), and this information can be used to learn the intensiveness factor.

In step 103, if the intensiveness factor is known (e.g., "YES"), a temperature of each of the ALU (t_alu) and DRAM (t_dram) is obtained independently of each other. In step 103, a temperature is obtained only for the ALU and a temperature is obtained only for the DRAM.

Figure 2:
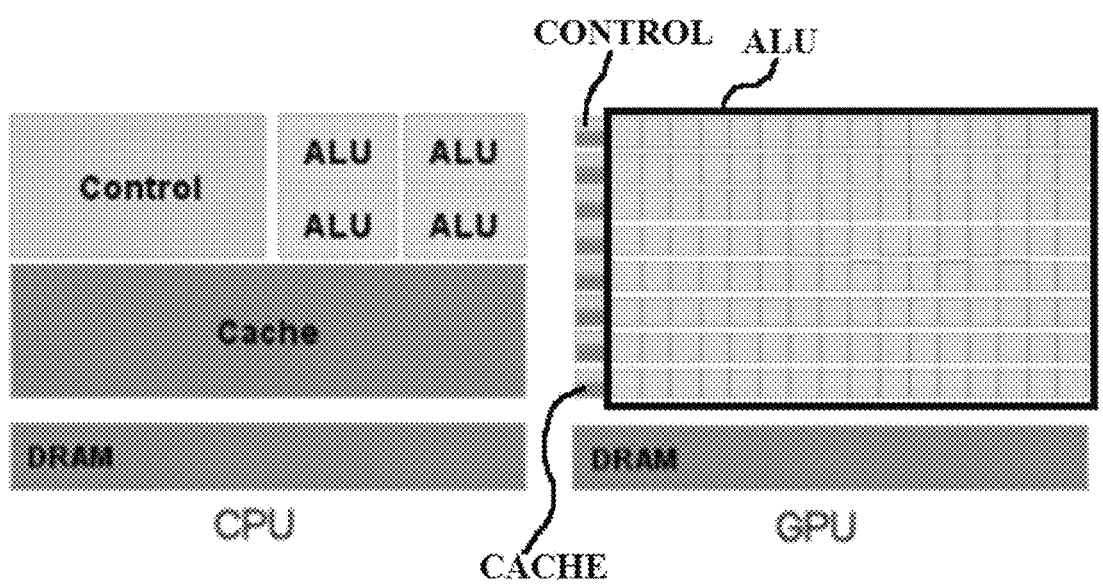
FIG. 2 exemplarily shows a component configuration of a GPU compared to a CPU according to an embodiment of the present invention.

With reference now to the example depicted in FIG. 2, ALU and DRAM units of a GPU are spaced apart by a gap (e.g., physically separated on the GPU) such that a temperature of the ALU can be very different from a temperature of the DRAM. Thermal conductance does not make their temperature the same.

In such example, in step 103, the independent temperatures can be obtained via two sensors (e.g., thermometers) that monitor the ALU temperature and the DRAM temperature in real time, independently of each other.

In step 104, the new task is accepted if after the new task is run, the intensiveness factor of each of the ALU and the DRAM will not cause the temperature of the ALU or the DRAM to exceed a predetermined threshold. For example, let's assume that a temperature of the ALU is 50 degrees Fahrenheit and a temperature of the DRAM is 25 degrees Fahrenheit and the ALU has a predetermined threshold temperature value of 80 degrees Fahrenheit and the DRAM has a predetermined threshold temperature of 45 degrees Fahrenheit. In this example, if the intensiveness factor causes either of the DRAM or the ALU to have a temperature which exceeds the predetermined threshold temperature (e.g, 45 degrees Fahrenheit for the DRAM and 80 degrees Fahrenheit for the ALU), the new task will not be accepted.

In other words, in step 104, the intensiveness factor and the temperature for each of the ALU and DRAM can be weighed (e.g., a decision made based on) to determine if the new task will cause either of the temperatures to exceed a predetermined threshold and based on the decision, accept or reject the new task. Thus, new tasks can be processed more efficiently by maintaining a temperature that does not reduce efficiency of the GPU.

Again, in step 104, a new task can be scheduled for execution on the GPU if the intensiveness factor causes each of the ALU temperature and the DRAM temperature to remain below a predetermined threshold value.

In step 105, if the new task is accepted for execution by the GPU, the ALU and the DRAM of the GPU is observed to adjust the intensiveness factor for the new task for each of the ALU and the DRAM. In step 105, the new task is observed as it is being run by the GPU, including any change in temperature of the ALU and DRAM (e.g., Δt_alu and Δt_dram) and the intensiveness factor for the ALU and the DRAM is adjusted, based on the observed change in temperature.

In some embodiments, in step 105, the new task being run is observed to calculate a change in the ALU temperature and in the DRAM temperature to adjust the intensiveness factor for each of the ALU and the DRAM.

In step 106, a condition to accept the new task based on a prior execution of the new task can be learned. That is, in step 106, the acceptance conditions of the new task can be updated over time. For example, it is known that as a GPU ages, its performance can decrease. In another example, a GPU's performance and thermal characteristics may change based on its adjustment to a different working frequency. s. Therefore, in some embodiments, the GPU's acceptance of new tasks may correspondingly adjust over time as the properties of the GPU changes.

Alternatively, the condition for accepting the new task in step 106 can be based on a user input.

It is noted that although the embodiments described herein referred to a GPU, the method 100 can be applied to any processor having multiple processing components that a temperature of each processing component can be individually measured to efficiently schedule tasks. For example, the method 100 can be utilized with the CPU shown in FIG. 2 because the ALU and the DRAM are separated and the temperature of each can be independently determined.

Further, it is noted that although embodiments are described herein with regard to a single GPU, the method 100 can be used on a plurality of GPUs and scheduling the tasks accordingly.

That is, in a multi-GPU (or processing environment), the invention also allows one to decide which GPU (processor) to assign a new task from a queue depending upon its intensiveness and its effect on temperatures of the ALU and DRAM (other processing components).

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 3, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
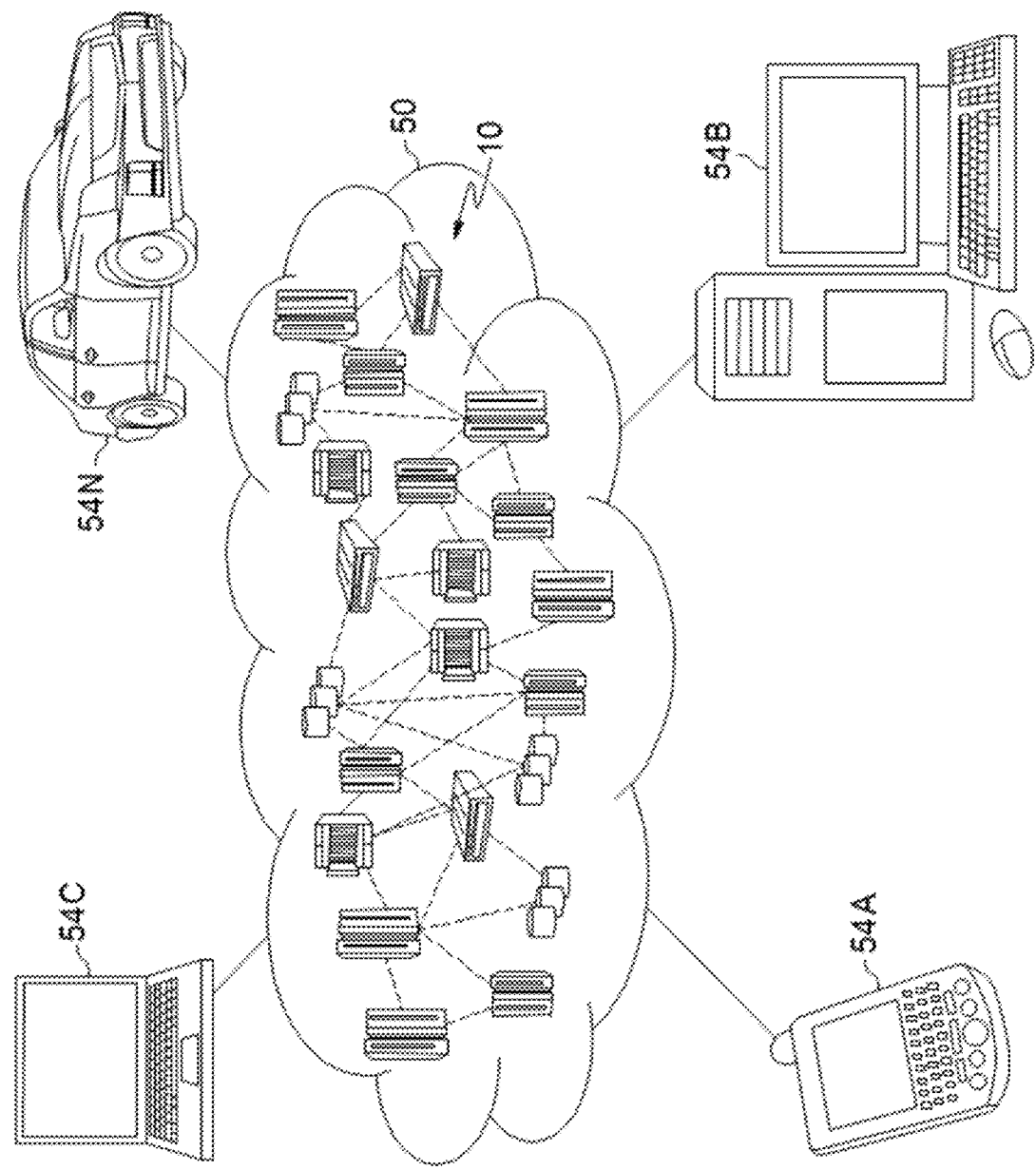
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
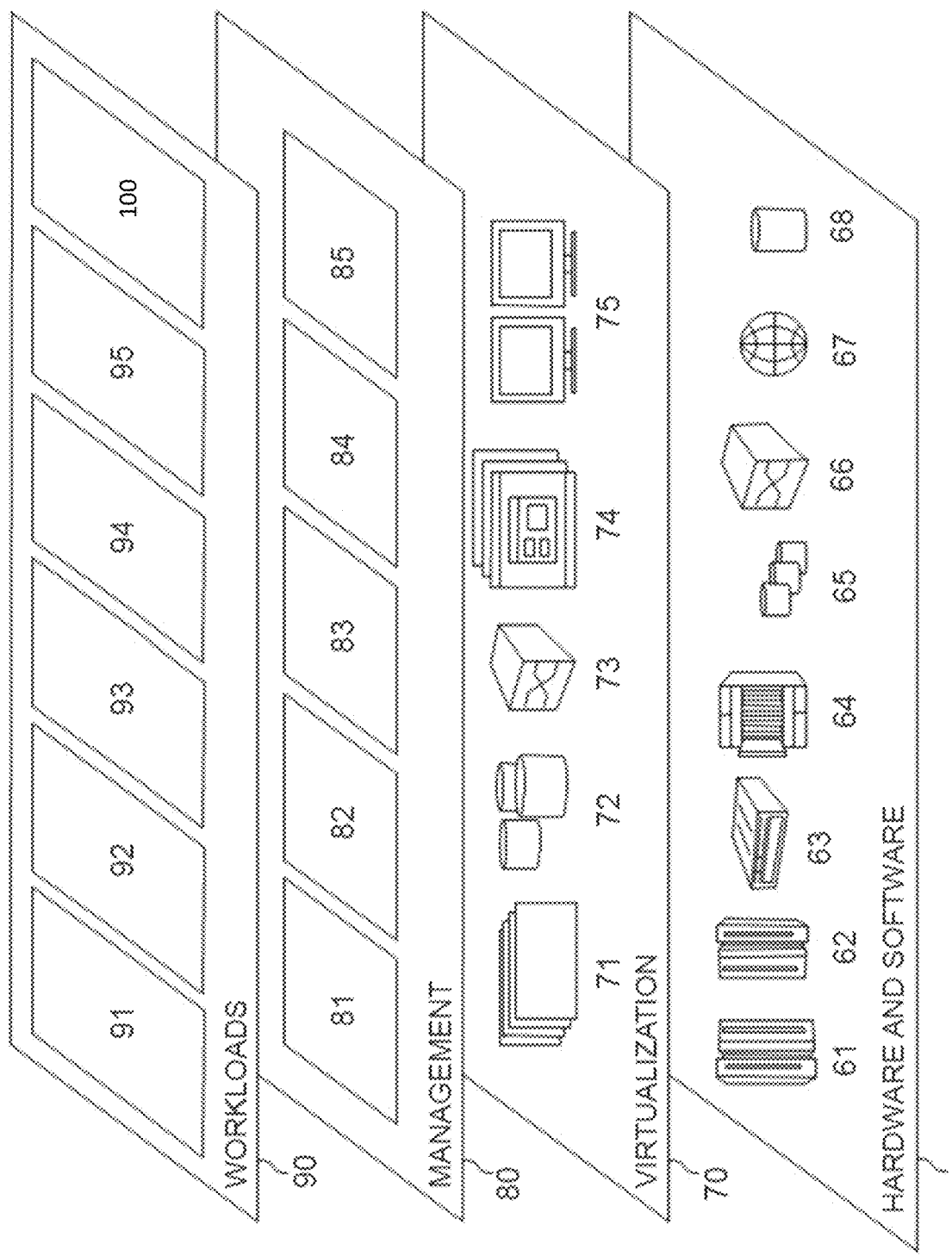
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the temperature-aware task scheduling method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method for a task on a graphical processing unit (GPU), the method comprising:

obtaining a temperature of computational units of the GPU;

determining an increase to the temperature that would occur independently in each of an internal arithmetic logic unit (ALU) and a dynamic random-access memory (DRAM) of the GPU; and accepting and executing the task to the GPU based on the increase to the temperature of the computational units of the GPU, wherein the computational units of the GPU comprise the ALU and the DRAM.

2. The method of claim 1, wherein the accepting and executing the task to the GPU is based on the ALU temperature and the DRAM temperature.

3. A computer program product for temperature-aware task scheduling a task on a graphical processing unit (GPU), the computer program product comprising a computer readable storage medium having program instructions embodied therewith, the program instructions executable by a computer to cause the computer to perform:

determining an increase to a temperature that would occur independently in each of an internal arithmetic logic unit (ALU) and a dynamic random-access memory (DRAM) of the GPU; and accepting and executing the task to the GPU based on the increase to the temperature.

4. A temperature-aware task scheduling system for a task on a graphical processing unit (GPU), said system comprising:

a processor; and a memory, the memory storing instructions to cause the processor to:

determining an increase to a temperature that would occur independently in each of an internal arithmetic logic unit (ALU) and a dynamic random-access memory (DRAM) of the GPU; and accepting and executing the task to the GPU based on the increase to the temperature.

5. The method of claim 1, further comprising determining a memory usage requirement for the task.

6. The method of claim 1, further comprising determining an intensiveness factor for a computational requirement of the task.

7. The method of claim 1, further comprising determining an intensiveness factor for each computational requirement of the task.

8. The method of claim 1, further comprising determining data for executing the task from a database storing past data of the task being previously run on the GPU.

9. The method of claim 1, further comprising determining data for executing the task.

10. The method of claim 1, further comprising determining an increase to the temperature that would occur by accepting and executing the task.

* * * * *